United States Patent [19]

Andrews et al.

[11] Patent Number: 4,601,040

[45] Date of Patent: Jul. 15, 1986

[54] CONDENSERS

[75] Inventors: Anthony J. Andrews; Keith H. Errey; Andrew J. Kearsley; Colin E. Webb, all of Oxford, England

[73] Assignee: The Secretary of State for Defence in Her Britannic Majesty's Government of the United Kingdom of Great Britain and Northern Ireland, London, England

[21] Appl. No.: 684,084

[22] Filed: Dec. 20, 1984

Related U.S. Application Data

[63] Continuation-in-part of Ser. No. 525,488, Aug. 22, 1983, abandoned.

[30] Foreign Application Priority Data

Sep. 6, 1982 [GB] United Kingdom ................. 8225307

[51] Int. Cl.$^4$ .............................................. H01S 3/22
[52] U.S. Cl. ........................................ 372/57; 372/34; 372/35; 62/383; 62/514 R; 62/95; 165/110; 165/156
[58] Field of Search ...................... 372/58, 57, 59, 34, 372/35; 62/383, 514 R, 95; 165/110, 156

[56] References Cited

U.S. PATENT DOCUMENTS

| 2,935,856 | 5/1960 | Gufford | 62/95 |
| 3,063,681 | 11/1962 | Duguid | 165/110 |
| 3,896,658 | 7/1975 | Hahn | 62/383 |
| 4,036,290 | 7/1977 | Kelly | 165/110 |
| 4,061,184 | 12/1977 | Radcliffe | 165/156 |
| 4,116,017 | 9/1978 | Oberpriller | 62/514 R |
| 4,369,636 | 1/1983 | Durcell et al. | 62/514 R |
| 4,489,569 | 12/1984 | Sitte | 62/514 R |

Primary Examiner—Léon Scott, Jr.
Attorney, Agent, or Firm—Cushman, Darby & Cushman

[57] ABSTRACT

A condenser including a condenser chamber having an extension portion extending through the base of a refrigerant storage vessel. The length of the conduction path along this portion is variable. This may be performed by partial retraction of the extension from the vessel, or by inclusion of one or more insulating shields. Both extension and shield may be threaded. The vessel may be of thin stainless steel or compliant solid insulating material, allowing fine adjustment of the conductive path length by tightening of the shield against the base of the vessel. The internal surface of the chamber may be undulated, in particular by threading, to promote turbulent flow and mixing within the chamber. The extension may be recessed and joined to a filling tube, to facilitate initial cool down. The complete condenser is encased by expanded polyurethane foam inside a box.

17 Claims, 4 Drawing Figures

CONDENSERS

This application is a continuation-in-part of patent application Ser. No. 525,488, filed Aug. 22, 1983 (now abandoned).

TECHNICAL FIELD

This invention concerns condensers, particularly condenser traps for gas purification as also condensers for gas fractionation. The invention has application, for example, to gas purification in rare-gas halide (RGH) excimer laser support systems.

BACKGROUND ART

A common problem associated with rare gas halide lasers is a decrease with time of the output energy due to the buildup of contaminant species within the laser discharge head. These contaminants either arise from reactions involving the halogen donor with materials used in the laser system or are introduced with the gas mixture of commerical grade gases. Removal of these impurities leads to dramatic increases in the gas life times and consequently improved laser performance and reduced running costs.

The impurities can be removed either by chemical gettering (a process which also removes the halogen donor and requires continued replenishment—Appl. Phys. Lett. 32(5) (1978) p 291-2) or by selective condensation. For this latter method it is fortuitous that the rare gases and the halogen donors used in rare gas halide lasers have significantly large vapour pressures at those temperatures at which most of the contaminant species can be condensed out of the gas mixture.

A trap operating at the fixed temperature of liquid nitrogen (77° K.) has shown the efficacity of the technique for the cryogenic removal of contaminants in an ArF laser system (IEEE JQE Vol 16 p 231-4 (1980)). However at 77° K. the vapour pressures of both xenon and krypton are too small to enable these component gases to take part in the rare gas halide laser activity, thus a trap operating at liquid nitrogen temperature cannot be generally employed in rare gas halide laser systems.

The condenser trap described for the argon fluorine (ArF) laser support system is one of simple construction, comprising a copper pipeline loop, part of which is immersed in a dewar of liquid nitrogen. The operational temperature of this trap is that of the liquid nitrogen refrigerant, and no regulation is afforded.

DESCRIPTION OF THE INVENTION

The invention is intended to provide a condenser that is operable at a temperature, indeed over a range of temperatures, above refrigerent temperature. With appropriate sealing and construction, such a condenser will allow the selective condensation of gaseous impurities from gas mixtures of halogen donor gas and the rare gases xenon and krypton.

According to the invention there is provided a condensor comprising:
an insulating vessel for containing refrigerant;
a body of large thermal mass,
a conductive member, extending from this body and protruding into the inside of the vessel through an aperture at the base of the vessel, for providing a conduction path between the body and the refrigerant;
a seal, co-operative with the vessel and the conductive member, to prevent egress of refrigerant through the aperture;
heat exchange means to provide the exchange of heat between gas and the body; and,
regulation means allowing change of the length of the conduction path between the body and refrigerant.

The insulating vessel may be of thick solid insulating material, for example polystyrene foam or similar plastics material, or thin low conductivity material such as stainless steel. Alternatively it may be fabricated in the form of an evacuated glass flask or metal dewar, though such fabrication entails greater difficulty.

It is preferable that the body and the conductive member are formed of a single bulk of material. This ensures good thermal contact between the body and the member.

The regulation means may comprise one or more insulating shields co-operative with the conductive member, each shield serving to insulate a portion of the member from refrigerant, and thus serving to increase stepwise the length of the conductive path between the body and the refrigerant.

Alternatively, or in conjunction with the one or more shields aforesaid, the member may be retractably engaged with the vessel. The length of the conduction path may then in this case be increased by retracting the member. To this end it is convenient to provide as conductive member one threaded over a significant part of its length. This also facilitates engagement of insulating shields, which may be provided in the form of nuts of insulating material.

For convenience of fabrication the body and heat exchange means may be of unified structure, these being provided by a thick walled condensation chamber with ports for the inlet and outlet of gas. It is beneficial to provide undulations of the internal surface of this chamber to optimise the surface area exposed to gas. Furthermore, it is beneficial if these undulations are pronounced, so that they may promote gas turbulence to better effect convection and mixing of the gas within the chamber. This may be realised most conveniently by threading the inside of the chamber. Preferably this chamber is coupled to the gas by an additional heat exchanger, one of the contraflow type—for example a double helix contraflow heat exchanger. This effects pre-cooling of the inlet gas and contributes to increase cooling efficiency.

To facilitate rapid gas cooling, for example during the initial cooling phase of operation, it is advantageous to provide a conductive member having an internal recess open at its upper end and provided with an extended filling tube of low conductivity material. Refrigerant may then be placed inside the member in close proximity to the body to effect rapid cool-down. Since the filling tube is of low conductivity material, little heat is conducted from the vessel refrigerant to ambient.

BRIEF INTRODUCTION OF THE DRAWINGS

In the drawings accompanying this specification:
FIG. 1 depicts, in cross-section, a condenser constructed in accordance with the invention;
FIG. 2 depicts, in cross section, a part of this condenser, and illustrates the use of a number of insulating shields;
FIG. 3 depicts, in illustrative schematic, a rare-gas halide excimer laser and support system including the condenser depicted in FIG. 1 above; and FIG. 4 depicts in cross section, an alternative to the condensor of FIG. 1.

DESCRIPTION OF THE PREFERRED EMBODIMENT

An embodiment of the invention will now be described, by way of example only, with reference to the accompanying drawings.

Figure 1:
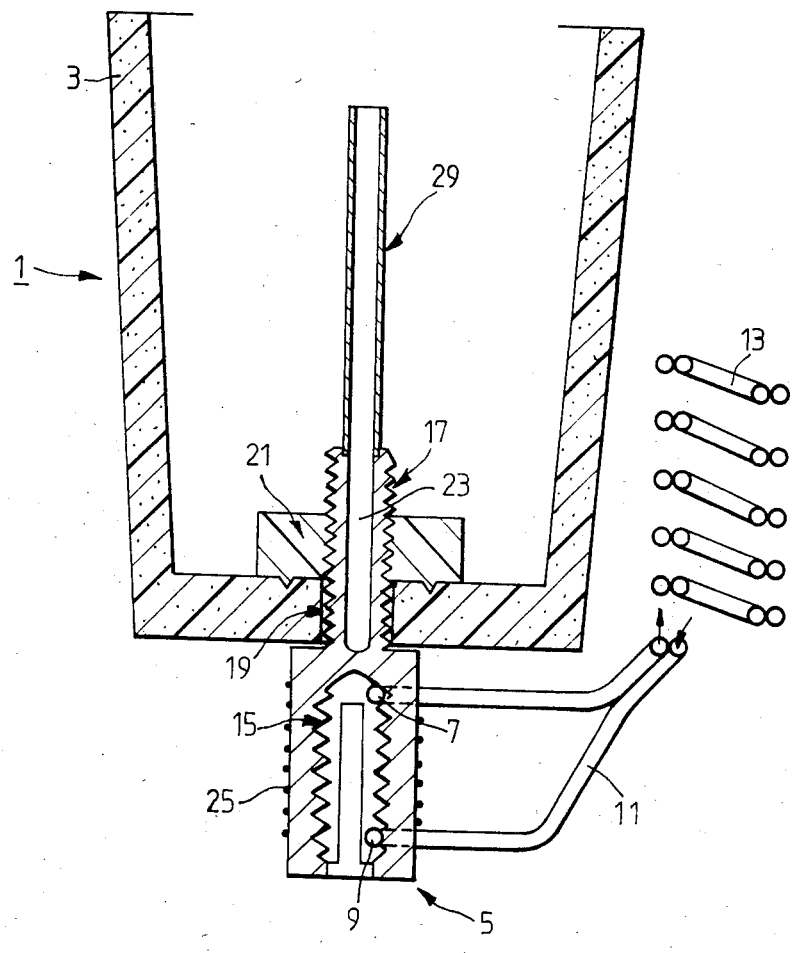

A condenser 1 is shown in FIG. 1. It comprises a liquid nitrogen reservoir 3 with a condensation chamber 5 fixed at its base. The reservoir 3, an insulating vessel, is in the form of a bucket dewar of expanded polystyrene foam. The condensation chamber 5, a body of large thermal mass, is thick walled and of high thermal conductivity material—copper. It therefore is relatively insensitive to thermal fluctuations and its temperature may thus be maintained reasonably constant. This chamber 5 has three ports: a gas outlet 7, a gas inlet 9 and a port for evacuation (not shown). The gas ports 7 and 9 are coupled to a system piping 11 and gas is passed through the chamber 5 via a helical contraflow heat exchanger 13. The additional exchanger 13 provides precooling of the inlet gas. The inside wall 15 of the chamber 5 is threaded to increase the surface area available for heat exchange and to promote turbulent gas flow patterns for maximum efficiency in the selective condensation and removal of unwanted contaminant species present in the gas.

At the upper extremity of the chamber 5 there is a conductive member 17 in the form of a stem of copper material. This member 17 serves to provide a heat conduction path between the chamber 5 and refrigerant contained in the vessel 3. This member 17 is threaded along its length and projects through an aperture 19 in the bottom of the vessel 3. A sealing nut 21 of insulating material—P.T.F.E.—is engaged upon the member thread and effects a seal with the member 17 and with the vessel 3, preventing egress of the liquid nitrogen refrigerant through the aperture 19.

The member 17 and the chamber 5 are made as a single unit from a bulk of material—a single piece of copper. This ensures excellent thermal contact between the member 17 and the chamber 5.

Figure 2:
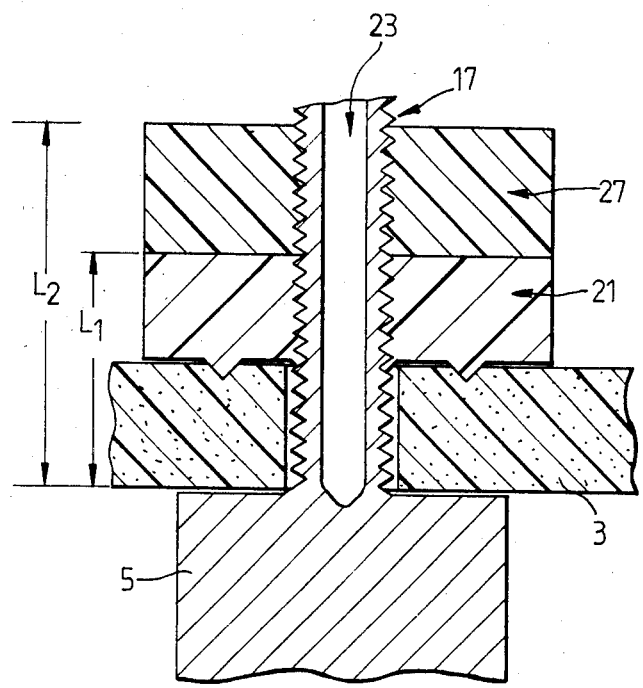

The rate of heat flow through the conductive member 17 is governed by the ratio of the length of the effective conduction path to its cross-sectional area. The conductive member 17 shown has a central recess 23 and its cross section is thus annular. The relevant cross-section is that of an annulus of minimum radius (the radius shown varies with thread depth). The length L1 of the conduction path is shown in FIG. 2. Regulation of the heat flow is achieved by setting the length of the shielded part of the conductive member 17 by adjusting the sealing nut 21. Since the plastics material of the dewar vessel 3 is compliant, this allows a degree of fine regulation.

Fine temperature control is achieved electrically. A fine heating coil 25 is wound directly around the condensation chamber block 5 and in conjunction with a thermocouple sensor (not shown) and feedback servo circuit (not shown) this is used to maintain selectable stable temperatures.

To avoid excessive consumption of the liquid nitrogen refrigerant, the dewar 3, the condensation chamber 5 and the additional heat exchanger 13 are potted in insulating material—e.g. expanded polyurethane foam—inside a rigid box. This also serves to give greater mechanical strength, rigidity and security.

To operate at higher temperatures (e.g. for gas mixtures containing xenon) extra heat shields 27—P.T.F.E. nuts—may be added to the threaded stem of the conductive member 17, and screwed down onto the sealing nut 21 where a further seal against the liquid nitrogen refrigerant is formed between the upper surface of the P.T.F.E. sealing nut 21 and the lower surface of the additional P.T.F.E. nut 27. This serves to increase the length of the conductive path (L2 in FIG. 2) and consequently reduce the rate of heat flow.

To provide fast cool-down over-ride the conductive member 17 is provided with a central recess 23 extending down to near the condensation chamber 5. This recess 23 is co-extensive with a filling tube 29 of low conductivity material—stainless steel. Introducing liquid nitrogen refrigerant directly into this tube 29 allows the temperature regulation action of the conductive member 17 to be over-ridden and heat to be rapidly transferred from the condensation chamber 5 directly to the liquid nitrogen refrigerant. Rapid cool-down times are obtainable so that the condenser 1 can be quickly brought into service each occasion that is required.

Figure 3:
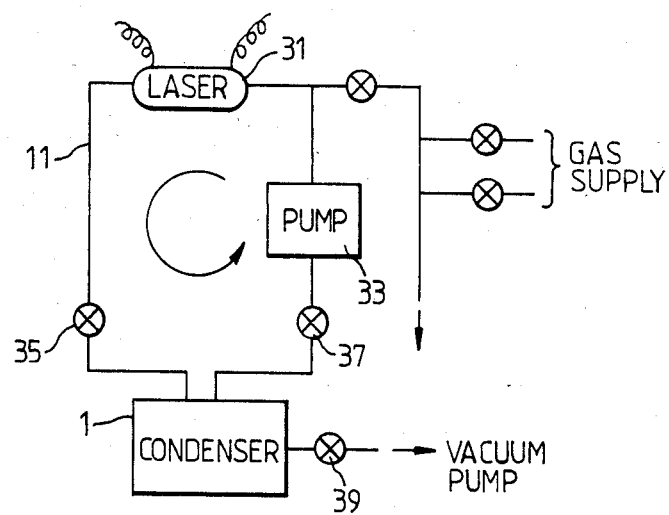

Use of this condenser 1 in a rare gas halide laser support system is illustrated in FIG. 3. Gas, introduced from supply bottles, is admitted to the support system and circulated through the head of the laser 31 and the condenser 1 by means of a pump 33. The gas is circulated in a closed loop provided by the laser 31, the condenser 1, and connective copper piping 11. The condensation chamber 5 is accessed via three on/off valves 35, 37 and 39. Two of these 35 and 37 are used to connect the condenser trap 1 into the closed loop. The third valve 39 is connected to a vacuum pump (not shown) and allows the chamber 5 to be pumped clean independent of the laser head 31.

The condensation chamber 5 can be held at or near liquid nitrogen temperature—using the over-ride facility—to condense krypton or xenon from the system. It thus also serves as a storage device for these gases and can be so used during laser head servicing.

The condenser 1 may also be used to control laser operation. In the case of xenon-chloride (XeCl) excimer laser, the condensation chamber 5 may also serve as a reservoir for hydrogen chloride (HCl)—a condensable halide, the halide chlorine ion (Cl) donor in the XeCl rare-gas halide laser gas mixture. As above, the greater part of the contaminant species are condensed out of the gas mixture, but because of the ability to maintain accurately a selected temperature in the chamber 65 it is also possible to maintain a fixed partial pressure of hydrogen chloride gas. The hydrogen chloride can be stored in the condenser trap 1 in liquid form and the temperature adjusted in the condenser trap 1 in liquid form and the temperature adjusted such that the required amount of hydrogen chloride gas is always present in the system regardless of how quickly or slowly the hydrogen chloride is being depleted. This "automatic top-up" ability means that the condenser trap 1 could extend the operating lifetime of XeCl gas mixtures almost indefinitely.

Figure 4:
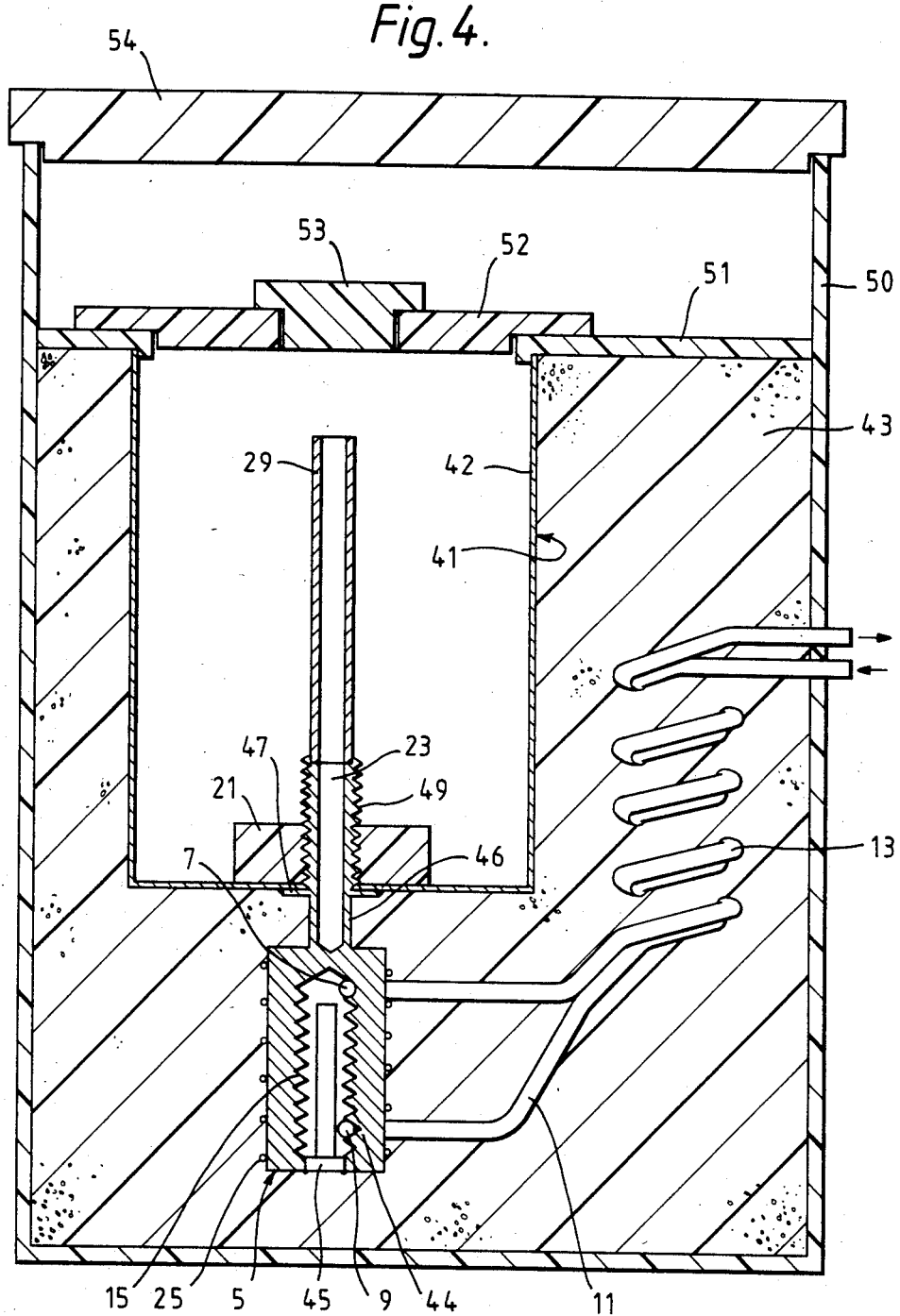

FIG. 4 shows an alternative condenser 41 to that shown in FIG. 1. Basically the polystyrene bucket 3 of FIG. 1 is replaced by a thin stainless steel bucket 42. As in FIG. 4 the bucket etc., are potted in expanded polyurethane foam 43.

The condenser 41 of FIG. 4 comprises a stainless steel bucket 42 of typical thickness 0.4 mm. Since stainless steel is a relatively poor conductor of heat the thin section bucket 42 has a low vertical heat loss. Also, due to potting insulation 43 the radial heat losses are low.

Below the bucket 41 is a condensation chamber constructed 5 as for FIG. 1 and given like reference numerals. It comprises a copper body 44 of large thermal mass with an internally threaded bore 15. This bore 15 is sealed by a copper plug 45 and integral finger. Hard solder is used to fix the plug 45 in position. Typically the chamber is 80 mm high, 38 mm diameter and the bore 15 is about 18 mm diameter. Leading from gas outlet 7 and inlet 9 in the chamber are pipes 11 soldered together and wound into a helix 13. This forms a contra-flow gas heat exchanger 13.

Projecting upwards from the chamber 5 and into the bucket 42 is a tubular conductive member 46 formed integrally with the chamber. Typically the tube 46 is of 2 mm wall thickness between the chamber and bucket. A flange 47 is formed on the tube and is sealed to the bucket by brazing. Inside the bucket 42 the tube 46 is externally screw threaded 49 to receive P.T.F.E. nuts 21; only one is shown others can be added to change the heat path length, as in FIG. 2, to vary the temperature inside the chamber 5. For some applications no nut 21 is required. At the top of the threaded section 49 is a filling tube 29 of stainless steel secured by hard soldering. This permits rapid cooling of the chamber 5 by liquid nitrogen poured down the bore 23.

Surrounding the chamber 5 is a heating coil 25 as in FIG. 1. The bucket 42, condensation chamber 5, heat exchanger 13 etc are secured in a rigid box 50 by insulating material 43. For example polyurethane may be foamed into the box 50 to pot the condensor 41. This locates and thermally insulates all the components. A P.V.C. ring 51 fits on top of the bucket 42 and holds a lid 52 provided with a filling aperture and plug 53. The box 50 itself also has a lid 54 e.g. of P.V.C.

I claim:

1. A condenser comprising:
   an insulating vessel adapted for containing a refrigerant liquid and having a base with an aperture in it;
   means for condensing gas to remove gaseous contaminates including a chambered body having a large thermal mass, located adjacent to the base of said insulating vessel, said chambered body having an inlet port and an outlet port adapted for respectively conveying an influent contaminated gas and an effluent purified gas;
   means for conducting heat in a path between said chambered body and said refrigerant liquid and extending from said chambered body into said insulating vessel through said aperture in said base of said insulating vessel;
   sealing means for preventing the egress of said refrigerant liquid through said aperture, said sealing means being located between said insulating vessel and said conducting means;
   means for adjusting the temperature of said chambered body by changing the length of said path between said chambered body and said refrigerant liquid; and
   heating means for regulating the temperature of said chambered body by electric heating.

2. A condenser as claimed in claim 1 wherein said chambered body and said conducting means are formed of a single bulk of material.

3. A condenser as claimed in claim 1 wherein said means for adjusting includes at least one insulating shield between said refrigerant liquid and said conducting means, said insulating shield insulating a portion of said conducting means from said refrigerant liquid contained in said insulating vessel to incrementally change stepwise the length of said path and hence the amount of heat conducted by said conducting means between said chambered body and said refrigerant liquid.

4. A condenser as claimed in claim 3 wherein said conducting means is a rod member, and said member and said insulating shields are threaded and engaged.

5. A condenser as claimed in claim 4 wherein said insulating vessel is formed of a compliant solid insulating material enabling fine adjustment of said conducting means upon adjustment of said insulating shields.

6. A condenser as claimed in claim 1 wherein said insulating vessel is thin walled.

7. A condenser as claimed in claim 6 wherein said insulating vessel is formed of stainless steel.

8. A condenser as claimed in claim 6 further including a box and thermally insulating material inside said box supporting said vessel, body, conducting means, sealing means and adjusting means.

9. A condenser as claimed in claim 6 wherein said insulating material is a foamed in situ material.

10. A condenser as claimed in claim 6 wherein said insulating material is an expanded polyurethane foam.

11. A condenser as claimed in claim 1 wherein said conducting means is retractably engaged with said insulating vessel.

12. A condenser as claimed in claim 1 wherein the internal surface of said chambered body is undulated creating an irregular surface to promote turbulence of said influent contaminated gas.

13. A condenser as claimed in claim 12 wherein the internal surface of said chambered body is undulated by threading.

14. A condenser as claimed in claim 1 wherein said inlet port and said outlet port of said chambered body are adapted for connection to a contra-flow heat exchanger.

15. A condenser as claimed in claim 1 wherein said conducting means is a rod member with an internal recess at its remote end from said chambered body and has an extended filling tube of low conductivity material.

16. A rare gas halide excimer laser system comprising:
   a laser head;
   a pump;
   a closed circulation loop including a condenser, said condenser having;
   an insulating vessel adapted for containing a refrigerant liquid and having a base with an aperture in it;
   means for condensing gas to remove gaseous contaminates including a chambered body having a large thermal mass located adjacent to the base of said insulating vessel, said chambered body having an inlet port and an outlet port adapted for respectively conveying an influent contaminated gas and an effluent purified gas;
   means for conducting heat in a path between said chambered body and said refrigerant liquid, and extending from said chambered body into said insulating vessel through said aperture in said base of said insulating vessel;
   sealing means for preventing the egress of said refrigerant liquid through aperture, said sealing means being located between said insulating vessel and said conducting means;

means for adjusting the temperature of said chambered body by changing the length of said path between said chambered body and said refrigerant liquid; and heating means for regulating the temperature of said chambered body by electric heating.

17. A rare gas halide excimer laser system as claimed in claim 16 wherein said rare gas halide excimer laser system is a xenon chloride excimer laser system in which said chambered body operates as a heat exchanger, a condensate trap and a reservoir for hydrogen chloride gas residue and said xenon chloride system includes, means for controlling the temperature of said chambered body to maintain a fixed partial pressure of said hydrogen chloride gas residue therein.

* * * * *